United States Patent

Karnopp et al.

[11] Patent Number: 5,116,077
[45] Date of Patent: May 26, 1992

[54] HYDROPNEUMATIC SUSPENSION SYSTEM

[75] Inventors: Dean C. Karnopp, Davis, Calif.; Dietrich Sahm, Bad Urach, Fed. Rep. of Germany; Walter Klinkner, Stuttgart, Fed. Rep. of Germany; Dieter V. Scarpatetti, Esslingen, Fed. Rep. of Germany

[73] Assignee: Mercedes-Benz AG, Fed. Rep. of Germany

[21] Appl. No.: 610,141

[22] Filed: Nov. 7, 1990

[30] Foreign Application Priority Data

Nov. 7, 1989 [DE] Fed. Rep. of Germany ....... 3936987
Feb. 6, 1990 [DE] Fed. Rep. of Germany ....... 4003493

[51] Int. Cl.⁵ .................. B60G 11/26; B60S 9/00
[52] U.S. Cl. ........................... 280/707; 280/714; 280/6.12
[58] Field of Search .......... 280/707, 708, 714, DIG. 1, 280/6.12, 840

[56] References Cited

U.S. PATENT DOCUMENTS

| | | | |
|---|---|---|---|
| 2,869,893 | 1/1959 | Sahagian | 280/714 |
| 4,295,660 | 10/1981 | Toti et al. | 280/714 |
| 4,478,431 | 10/1984 | Muller et al. | 280/710 |
| 4,846,496 | 7/1989 | Tanaka et al. | 280/707 |

FOREIGN PATENT DOCUMENTS

| | | |
|---|---|---|
| 1050669 | 2/1959 | Fed. Rep. of Germany . |
| 2048323 | 4/1972 | Fed. Rep. of Germany . |
| 2923357 | 12/1979 | Fed. Rep. of Germany . |
| 3604068 | 2/1988 | Fed. Rep. of Germany . |
| 3639995 | 6/1988 | Fed. Rep. of Germany . |
| 991109 | 10/1958 | France . |

Primary Examiner—Charles A. Marmor
Assistant Examiner—Paul Dickson
Attorney, Agent, or Firm—Evenson, Wands, Edwards, Lenahan & McKeown

[57] ABSTRACT

Arranged between hydropneumatic supporting units of a vehicle levelling system is an active bypass and feed system, by means of which hydraulic medium can be displaced between supporting units of different axles or sides of the vehicle, at the same time bypassing a reservoir, in order to counteract pitching and rolling movements of the vehicle.

13 Claims, 3 Drawing Sheets

HYDROPNEUMATIC SUSPENSION SYSTEM

BACKGROUND AND SUMMARY OF THE INVENTION

The invention relates to a hydropneumatic suspension system for motor vehicles, with hydropneumatic supporting units assigned to the vehicle wheels and with a levelling control system interacting with these supporting units and having level-control valves. The supporting units are connectable to a hydraulic pressure source for the reception of hydraulic medium or to a reservoir for the discharge of hydraulic medium from the supporting units via the level control valves as a function of the lifting position of the wheels.

Vehicles with suspension systems of this general type are known, for example, from German Patent Document DE-A-2,923,357 and are characterized by a high suspension comfort.

A fundamental disadvantage of this known suspension system is that energy has to be provided for the levelling, the hydraulic medium introduced into a particular supporting unit being extracted from a high-pressure accumulator, the pressure of which has to be higher than the maximum pressure which can occur in any one of the supporting units. The energy necessary for this is taken from the running drive of the motor vehicle and fed to a corresponding hydraulic pump which recharges the high-pressure accumulator by extracting the hydraulic medium from a reservoir under only low pressure. During a subsequent lowering of the level, when the hydraulic medium is discharged from a supporting unit into the reservoir, this energy is wasted without being used.

There can be an undesirably large amount of energy required for the levelling, especially when pitching or rolling movements of the vehicle body are to be counteracted. For example, when pitching movements occur, that is to say when the vehicle body seeks to rotate relative to its horizontal transverse axis, the supporting units of a particular axle (for example, the front axle) are connected to the high-pressure accumulator, whilst the supporting units of the other axle (for example, the rear axle) are connected to the reservoir, so that a moment counteracting the particular pitching moment can be generated. The same applies accordingly to the compensation of a rolling moment which acts on the vehicle body and which seeks to rotate the vehicle body in relation to its horizontal longitudinal axis. Here, the supporting units of one vehicle side are connected to the high-pressure accumulator and the supporting units of the other vehicle side to the reservoir. In the latter case, according to German Patent Document DOS 2,923,357, the energy requirement is especially high precisely because an additional support control takes effect and, in general, ensures that a hydraulic pressure compensation is carried out between the supporting units of the rear axle. This means that the supporting units of the rear axle are additionally connected directly to one another via a throttle line, whilst at the same time one supporting unit remains connected to the high-pressure accumulator and the other supporting unit to the reservoir. This ensures that rolling moments are preferably counteracted via the supporting units of the front axle, in order to bring about a desired driving behavior on bends. With this, although the driving safety is increased, nevertheless the pressure compensation taking place via the throttle line involves additional throttle losses between the rear supporting units.

Moreover, in hydropneumatic suspensions, it is known to keep the power requirement for the levelling low by counteracting pitching and rolling movements of the vehicle body with special measures, without the need to feed additional hydraulic medium from the high-pressure accumulator to the particular supporting units undergoing increased load.

In order, for example, to keep rolling movements of the vehicle body within limits, whilst at the same time ensuring a comfortable and soft adjustment of the hydropneumatic suspension system, it's possible to provide mechanical transverse stabilizers of large dimensions which so couple wheels located opposite one another relative to the longitudinal axis of the vehicle that, during the compression and expansion of the suspension of a particular wheel, a force is also exerted in the same compression and expansion direction on the respective wheel located opposite it. Thus, during the compression of the suspension of one wheel, the supporting unit of the other wheel located opposite it in relation to the longitudinal axis of the vehicle is also loaded in the compression direction. As a result of this mode of operation of the transverse stabilizers, even with a soft adjustment of the hydropneumatic suspension system an excessively sharp lateral inclination of the vehicle body during fast driving on bends can be prevented in a desirable way. However, a compromise has to be made as regards the calculation of the transverse stabilizers. In particular, if the transverse stabilizers are calculated to be very hard, a lateral inclination of the vehicle body is indeed restricted especially effectively during fast driving on bends. But driving comfort can then be impaired considerably during fast driving straight ahead on bad roads, when road unevenness on one vehicle side occurs offset in relation to road unevenness on the other vehicle side and accordingly a particular wheel suspension on one vehicle side seeks to expand and the opposite wheel suspension on the other vehicle side to compress. The transverse stabilizers attempt particularly to counteract these mutually opposed suspension strokes.

So that undesirable pitching movements of vehicles with hydropneumatic suspension can largely be prevented, even with a soft spring adjustment, there can be, in addition to spring accumulators arranged in a wheel-coordinated manner on the supporting units of the wheels, additional spring accumulators which are arranged in an axle-coordinated manner and which are equipped with shut-off valves and can consequently, as required, be quickly rendered ineffective. As long as the additional spring accumulators are effective, the supporting units of a particular axle have a spring characteristic of low progressivity, that is to say the particular supporting forces generated increase comparatively slowly during compression. In contrast, when the additional spring accumulators are rendered ineffective, a spring characteristic of high progressivity is obtained, that is to say the supporting units oppose to a compression stroke a resistance which increases sharply with the stroke distance. The change-over valves assigned to the additional spring accumulators can be controlled virtually without inertia, so that the progressivity of the spring characteristic on a vehicle axle can be varied correspondingly quickly. It is thus possible, for example, to counteract the pitching moment occurring during the braking or acceleration of the vehicle, for example by rendering the additional spring accumulators of the front axle ineffective during braking and the additional spring accumulators of the rear axle ineffective during acceleration, with the result that the suspension of the front axle or the suspension of the rear axle is stiffened. The pitching movements of the vehicle body can thereby be limited in a desirable way. However, in this case each time an axle-coordinated stiffening of the suspension has to be accepted.

German patent Document DE-B-3,604,068 makes known a hydropneumatic suspension system, in which the pneumatic spring accumulators of each unit are connected, depending on the lifting position of the associated wheel relative to the vehicle body, either to the delivery side of a compressor, which at the same time is connected on the suction side to a low-pressure reservoir, or to the low-pressure reservoir.

Furthermore, according to German Patent Document DE-B-3,604,068, it is possible to connect the spring accumulator of a supporting unit of a particular wheel directly to the suction side of the compressor, the connection between the suction side and the low-pressure reservoir at the same time being shut off; simultaneously, the delivery side of the compressor can be connected to the spring accumulator of a supporting unit of another wheel. Thus, the compressor can convey, for example, pneumatic medium directly from a spring accumulator of a supporting unit on one vehicle side to a spring accumulator of a supporting unit on the other vehicle side, in order to counteract rolling moments.

A further pneumatic or hydropneumatic suspension is known from German Patent Document DE-A-3,639,995. Here, the inlet side of the compressor and its outlet side can be connected via corresponding changeover valves to the pneumatic spring accumulators of all the supporting units, in such a way that pneumatic medium can deliberately be conveyed from one supporting unit to another supporting unit Both pitching and rolling moments can be counteracted in this way.

A hydropneumatic suspension system is known from German Patent Document DE-A-2,048,323, and in this system there is arranged between the supporting units of each axle a double-acting piston/cylinder unit, the piston working chambers of which are so connected hydraulically to chambers of the supporting units that hydraulic medium can be extracted from the chamber of a supporting unit on one vehicle side and at the same time hydraulic medium can be fed to a corresponding chamber of the supporting unit on the other vehicle side. Rolling moments can thereby be counteracted.

German Patent Document DE-B-1,050,669 shows a basically similar arrangement, but for pneumatic suspension systems. Here, therefore, a double piston/cylinder unit is arranged between the pneumatic supporting units of a vehicle axle, in such a way that pneumatic medium can be discharged from one supporting unit and at the same time pneumatic medium introduced into the other supporting unit, in order to counteract rolling moments.

Finally, French Patent Document FR-A-991,109 shows a suspension system, in which arranged parallel to conventional mechanical springs, for example helical springs, are pneumatic elements which can be connected to a pressure source or vacuum source or the atmosphere, in such a way that increased supporting forces take effect on one side of the vehicle in comparison with the other vehicle side, in order to counter rolling moments.

Now an object of the invention is to provide a hydropneumatic suspension system which is characterized by a low power requirement for the pumping of hydraulic medium and by especially high suspension comfort, even under the action of pronounced pitching or rolling moments on the vehicle body; at the same time, good emergency running properties in the event of a malfunction of the control of this suspension system are to be guaranteed.

According to the invention, this object is achieved according to preferred embodiments in that an active bypass and feed system controlled by a computer and with an active feed unit is arranged in parallel with the levelling between the supporting units. As a function of the lifting position of the wheels and/or as a function of pitching or rolling moments acting on the vehicle the active bypass and feed system makes it possible to displace hydraulic medium directly, bypassing the reservoir and the pressure source, between supporting units located opposite one anther in relation to the longitudinal axis of the vehicle and/or the transverse axis of the vehicle. The bypass and feed system is quick-acting and the levelling works slowly in comparison with this system, and the drive motor for the active feed unit of the bypass and feed system can be cut off in any desired position and remain without a supply of energy, and at the same time, even when there are large pressure differences, the hydraulic medium cannot be displaced in the bypass and feed system during this cut-off state.

In the invention, therefore, hydraulic medium is displaced directly between the supporting units of different vehicle sides or between the front and rear supporting units, in order to raise one vehicle side whilst the other vehicle side is simultaneously lowered, or to move the vehicle front part appropriately in the opposite direction to the vehicle rear. Rolling and pitching moments can thereby be counteracted. Since, according to the invention, a displacement of the hydraulic medium, bypassing the reservoir or the pressure source, is provided for this purpose, the necessary amount of power required is small, because only the difference between the hydraulic pressures in various supporting units has to be overcome each time, but not the substantially greater pressure difference between the reservoir and the supporting units.

Furthermore, an especially high comfort can be guaranteed, because the displacement of the hydraulic medium between the supporting units has only a slight influence on the spring characteristic.

It is especially advantageous that, in preferred embodiments of the invention, the levelling can work slowly, that is to say with low power, because this system is not needed for compensating pitching and rolling movements of the vehicle. Essentially, this system simply has to be capable of setting the particular desired or predetermined level in a reasonable time when the vehicle is started. But a very low power is sufficient for this, especially since the particular level set changes only slightly when the vehicle is stopped, if a flow-off of hydraulic medium from the supporting units into the reservoir can be prevented, for example by appropriate shut-off valves.

It is advantageous, furthermore, that the bypass and feed system assumes a blocked state without a supply of power when the drive motor of its feed unit is stopped. Consequently, as long as neither rolling nor pitching moments occur, no power at all is needed for the bypass and feed system.

At the same time, this arrangement guarantees a good emergency running behavior of the vehicle in the event of a malfunction of the bypass and feed system. In this case, the bypass and feed system is simply shut down. When this happens, although the suspension system according to the invention can now counteract rolling and pitching moments essentially only passively, that is to say without active assistance by the bypass and feed system, the vehicle nevertheless remains ready for use with a good degree of driving comfort.

According to a first advantageous embodiment of the invention, the bypass and feed system can consist essentially of a line network arranged between the supporting units and with a motor-driven pump and of shut-off valves which are arranged on the line network and which make it possible to connect a particular supporting unit or a group of supporting units to the inlet side of the pump and another supporting unit or another group of supporting units to the outlet side of the pump or to isolate the supporting units or groups of these from one another. In this arrangement, therefore, a single central pump is sufficient for the bypass and feed system. By an appropriate control of the valves, a displacement of hydraulic medium between selected supporting units can then be obtained. By means of a kind of multiplex operation, it is also possible, at the same time, to ensure that a virtually simultaneous displacement of hydraulic medium between a plurality of supporting units takes place in a controllable way.

In a second preferred embodiment of the invention, there are arranged between supporting units located opposite one another in relation to the transverse axis of the vehicle and/or the longitudinal axis of the vehicle positive-displacement or piston/cylinder units with two chambers, the total volume of which remains constant irrespective of the positive-displacement or piston stroke, so that the hydraulic medium discharged from a supporting unit or a group of supporting units on one side can be fed in the same quantity to another supporting unit or to another group of supporting units.

Regardless of the design of the bypass and feed system, it can be expedient to arrange the hydropneumatic supporting units in parallel with mechanical spring units, for example conventional helical springs, so that the wheels are each supported hydropneumatically and mechanically in relation to the body. This can guarantee a virtually load-independent suspension behavior of the vehicle, without a load-dependent variation of the resonant frequencies for lifting movements of the body (body resonance) or lifting vibrations of the wheels (wheel resonance).

Other objects, advantages and novel features of the present invention will become apparent from the following detailed description of the invention when considered in conjunction with the accompanying drawings.

DETAILED DESCRIPTION OF THE DRAWINGS

Figure 1:
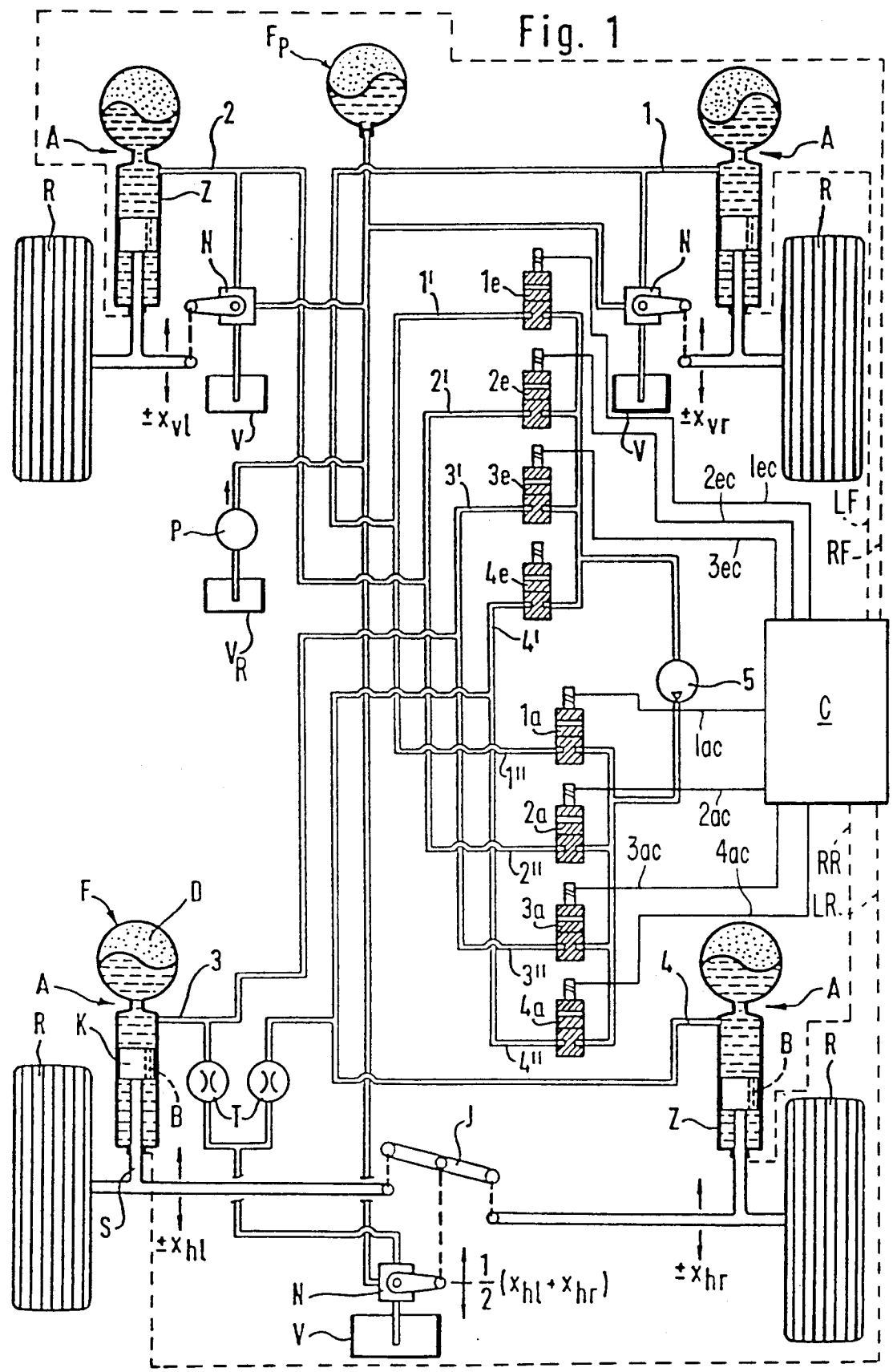
FIG. 1 is a schematic view which shows a first embodiment of the suspension system constructed according to the invention, the bypass and feed system being formed by a line network with a plurality of shut-off valves and a single central pump.

In all the embodiments illustrated in the drawings, each wheel R of the vehicle is assigned a hydropneumatic supporting unit A which in a way known per se consists essentially of a piston/cylinder unit with a cylinder Z and a piston K having a piston rod S arranged on one side, bores B passing axially through the piston K, and a spring accumulator F connected to the cylinder Z. The cylinders Z are each filled with hydraulic medium on both sides of the associated piston K, as is that region of the respective spring accumulator F communicating with the particular cylinder Z. Furthermore, arranged within the spring accumulator F is a compressed-gas cushion D which is isolated from the hydraulic medium by means of an elastic diaphragm or the like. In response to compression and expansion movements of the wheels R, the respective piston K is displaced in the associated cylinder Z. During a displacement in the compression direction, hydraulic medium is thereby positively displaced out of the chamber of the cylinder Z located above the piston K in each of FIGS. 1 to 3, through the piston bores B into the other chamber of the piston/cylinder unit and partially also into the respective spring accumulator F, so that the particular compressed-gas cushion is compressed. During a displacement of the piston K in the expansion direction, hydraulic medium is positively displaced out of that chamber of the particular piston/cylinder unit located on the same side as the piston rod into the chamber located above the piston K, and at the same time hydraulic medium flows out of the particular spring accumulator F into this last-mentioned chamber, the compressed-gas cushion D of the respective spring accumulator expanding correspondingly.

The particular static supporting force of the supporting units A is determined by the pressure of the hydraulic medium in the piston/cylinder unit and in the spring accumulator F connected to it and by the cross-section of the piston rod S or the difference in area between the upper and lower effective surfaces of the particular piston K.

The mean height of the wheels R in relation to the vehicle body (not shown) is determined by the quantity of hydraulic medium in the supporting units A.

So that the quantity of hydraulic medium in the supporting units A can be varied for a levelling of the vehicle, the supporting units A can, via level-control valves N, be shut off from the outside or can be connected either to a reservoir or a storage vessel V containing fluid medium or to the delivery side of a pump P, by means of which hydraulic medium is again fed to the respective supporting unit A from the reservoir or storage vessel V. To prevent pressure surges while this occurs, an additional spring accumulator $F_p$ is arranged on the delivery line of the pump P.

The supporting units A of the front wheels (show in the upper part of each of FIGS. 1 to 3) can each be assigned a separate level-control valve N which is actuated as a function of the lifting position $x_{vr}$ or $X_{vl}$ of the particular wheel. Within a relatively wide middle range of the said lifting positions, the level-control valves N of the supporting units A of the front wheels are closed.

When there is a pronounced displacement of the wheels R or pistons K in the expansion direction, the respective supporting unit A is connected to the reservoir or storage vessel V, in order to discharge hydraulic medium from the particular supporting unit A and consequently move the particular wheel R in the compression direction. If the wheels R or the respective pistons K are displaced sharply in the compression direction, the level-control valves N make a connection between the delivery side of the pump P and the respective supporting unit A, in order to introduce additional hydraulic medium into the particular supporting unit A and move the particular wheel R in the expansion direction.

The vehicle rear wheels (shown in the lower part of each of FIGS. 1 to 3) are assigned a common level-control valve N which is controlled as a function of the arithmetic mean value of the lifting positions $x_{hl}$ and $x_{hr}$ of the rear wheels R. This guarantees that the vehicle always acquires a statically definite three-point support.

When a stabilizer having a sufficiently strong effect is used for absorbing the rolling moments during driving on bends or when there is a asymmetric vehicle load, a level-control valve N jointly controlling the two supporting units A can also be provided on the front axle, with the result that the vehicle acquires a "two-point support with mechanical roll spring".

To make it possible to control the level-control valve N assigned to the rear wheels R as a function of the mean value of the lifting positions $x_{hr}$ and $x_{hl}$, for example the ends of a yoke J are coupled to the wheel suspensions of the rear wheels R, so that one end of the yoke executes a translational movement corresponding to the suspension strokes of one rear wheel and the other end of the yoke J executes a translational movement corresponding to the suspension strokes of the other rear wheel. Now if a point of the yoke J in the middle between the ends of the yoke J is connected in drive terms to an actuating member of the rear level-control valve N, this valve N is controlled as a function of the desired mean valve.

Another method of forming the mean value of the lifting positions $x_{hr}$ and $x_{hl}$ of the rear wheels is possible if the pick-up for controlling the common level-control valve N is made in the middle of a torsion-bar stabilizer (not shown).

In the line connecting the supporting units A of the rear wheels R, throttles T can be arranged on both sides of the level-control valve N of the rear wheels, in order to prevent a non-damped and rapid flow of hydraulic medium from one supporting unit A to the other and therefore an undesirably sharp reaction of the suspension strokes of one rear wheel on the suspension movements of the other rear wheel.

Figure 2:
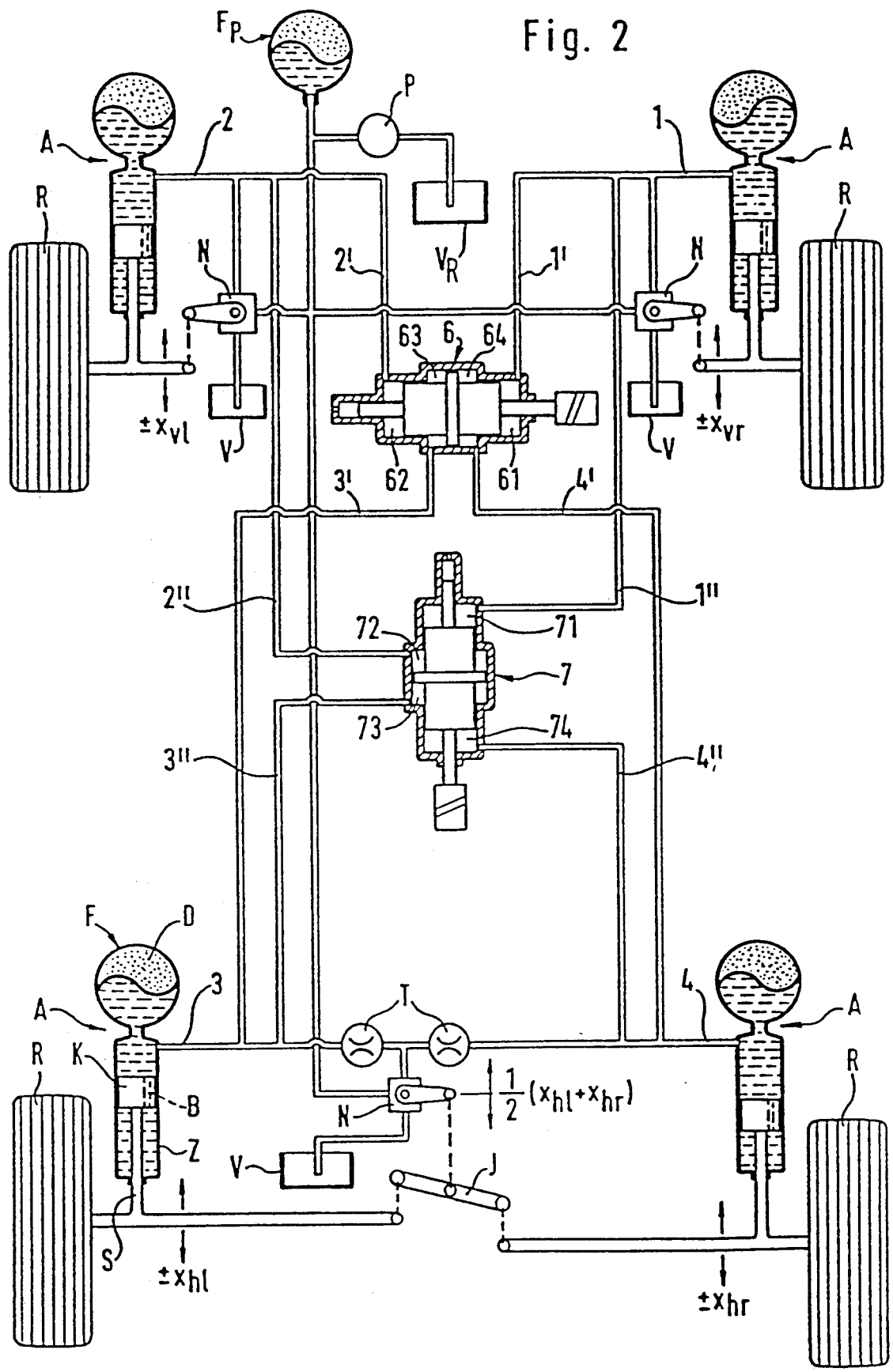
FIG. 2 shows a second embodiment of the invention, in which the bypass and feed system is constructed using double-acting piston/cylinder units which form a dual-circuit system and which are arranged respectively between the supporting units of different vehicle sides or different axles.
Figure 3:
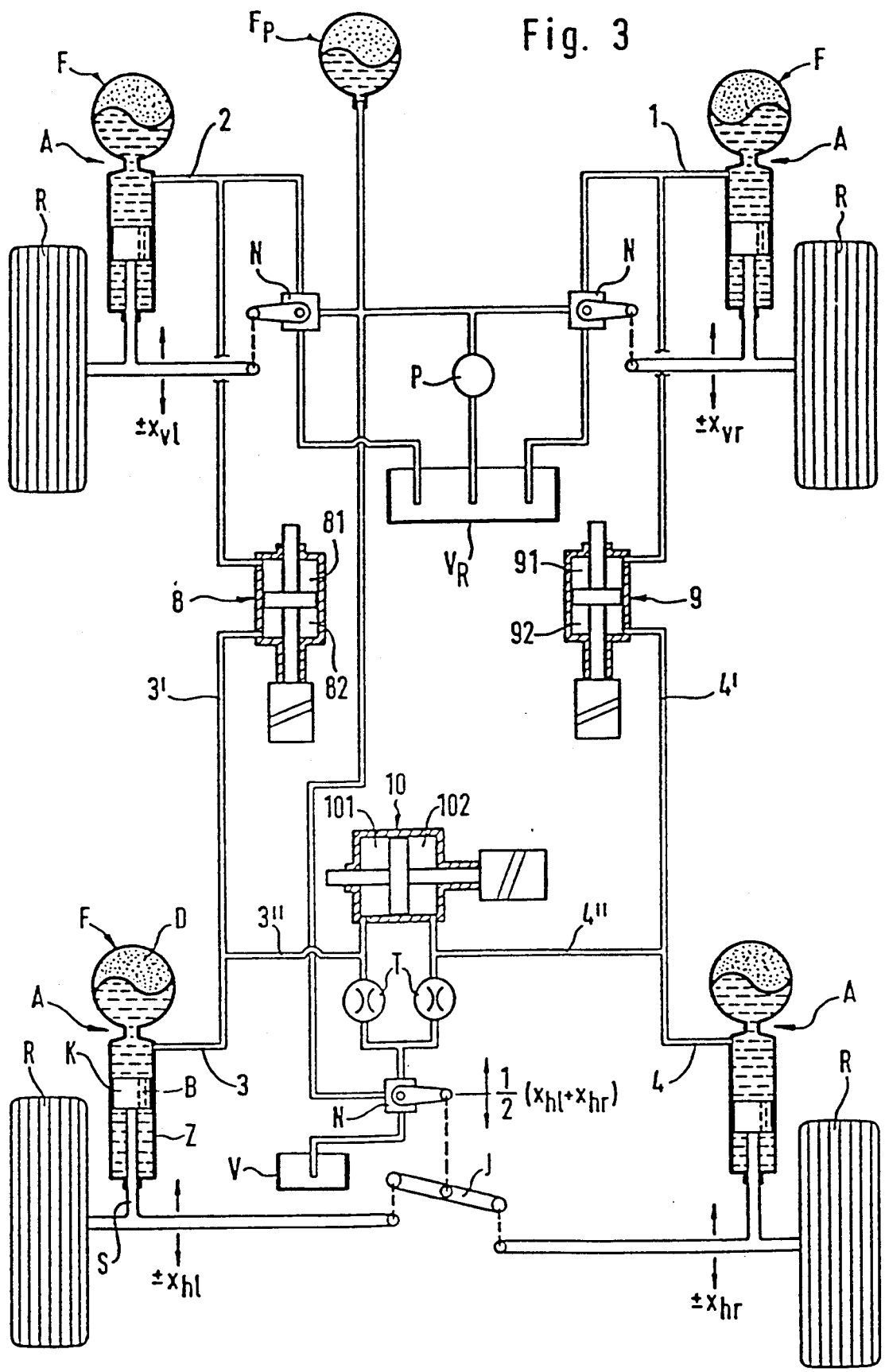
FIG. 3 shows a further embodiment with double-acting piston/cylinder units of especially simple design.

The above-described design of the hydropneumatic suspension system is provided in basically the same way in the embodiments illustrated in FIGS. 1 to 3 and is known per se. To that extent, therefore, the invention does not differ from conventional hydropneumatic suspension systems.

The particular feature of the invention is, above all, the way in which pitching or rolling movements of the vehicle body are counteracted.

It is indeed possible, in principle, to use the above-described elements of the hydropneumatic suspension system for this purpose. However, a high power is then required for the pump P, because, without further additional measures, pitching and rolling movements of the body can be counteracted only when relatively large quantities of the hydraulic medium can be conveyed for a short time by means of the pump P out of the reservoir or storage vessel V to particular supporting units A undergoing a high load in the compression direction. At the same time, at least the full pressure difference between the hydraulic pressure in the supporting units A and the virtually vanishing hydraulic pressure in the reservoir or storage vessel V always have to be overcome.

According to the invention, therefore, the above-described system components are used only for adjusting the mean height of the vehicle body in relation to the road. A pump P of low power is sufficient for this purpose, because the mean height of the vehicle has to be set virtually only at the start and thereafter remains unchanged or does not require any rapid change.

So that pitching and rolling movements of the vehicle can be counteracted quickly and effectively, a separate active bypass and feed system is arranged between the supporting units A.

In the embodiment illustrated in FIG. 1, this consists essentially of a line network with the lines 1 to 4 which lead to the individual supporting units A and which, via lines 1', 1" to 4', 4", are connected to shut-off valves 1e to 4e arranged on the inlet side of a motor-driven pump 5 and respectively to shut-off valves 1a to 4a arranged on the outlet side of the pump 5.

As long as no rolling or pitching movements of the vehicle occur, the said valves 1a to 1e remain closed. The pump 5 is in this case inactive.

Now if pitching movements of the vehicle occur, these can be counteracted in that, depending on the direction of the pitching movement, the pump 5 either discharges hydraulic medium from the supporting units A of the rear wheels via the lines 3 and 4 and feeds it to the supporting units A of the front wheels via the lines 1 and 2 or takes effect in the opposite direction. If, for example, hydraulic medium is to be discharged from the supporting unit A of the right rear wheel and at the same time hydraulic medium is to be fed to the supporting unit A of the right front wheel, the valves 4e and 1a are opened, so that the said supporting units are connected to one another via the pump 5 and hydraulic medium is displaced in the indicated way between the supporting units A on the right side of the vehicle. The respective remaining shut-off valves at the same time remain closed.

It is advantageous for the energy consumption of the active bypass and feed system if, after an appropriate "final state" has been reached, that is to say after a quantity of hydraulic medium corresponding to the particular driving states has been circulated (for example, in steady driving on a bend), its drive can be cut off and, as long as the driving state does not change, stays in this cut-off position, without the circulated hydraulic medium being able to flow back into its originally associated supporting units.

If hydraulic medium is to be discharged from the front right supporting unit A and fed into the rear right supporting unit A, the valves 1e and 4a are opened, so that the pump can generate a flow of hydraulic medium in the desired way.

In basically the same way, the supporting units A on the left side of the vehicle can be connected to one another via the pump 5.

Furthermore, rolling movements of the vehicle can be counteracted, in that hydraulic medium is fed from a supporting unit A of a wheel on one side of the vehicle by means of the pump 5 to a supporting unit A of a wheel on the other vehicle side. For example, hydraulic medium can be introduced from the right front supporting unit A into the left front supporting unit A by opening the valves 1e and 2a.

If a displacement of the hydraulic medium is to take place in the opposite direction, the valves 2e and 1a are opened.

The pump 5 only ever needs to work against the difference between the hydraulic pressures in different supporting units A. Since this difference always remains relatively small, a low power is sufficient for the pump 5.

In order to displace exactly defined quantities between the supporting units A, the valves 1a to 4e are preferably controlled in the multiplex mode, in such a way that only one of the valves 1e to 4e and one of the valves 1a to 4a are ever opened simultaneously. Correspondingly, only two supporting units A are ever coupled to one another by the pump 5. A rapid periodic change of the particular opened pairs of opened valves 1a to 4e then affords the possibility of simultaneously executing mutually superposed displacements of hydraulic medium between any units A. For example, on the one hand, hydraulic medium can be discharged from the right rear supporting unit and fed to the right front supporting unit and, on the other hand, hydraulic medium can also simultaneously be displaced in the same direction between the two left supporting units. For this, the pairs of valves 3e, 2a and 4e, 1a are alternately opened and closed in quick succession.

The control of the valves 1a to 4e takes place with the assistance of a computer control unit C (shown only in FIG. 1) which evaluates the signals from lifting-position transmitters assigned to the wheels R (signal lines LF, RF, LR and RR) so that pitching and rolling movements of the vehicle can be detected. In addition, the computer control unit C can also obtain signals from the accelerator pedal or the engine of the vehicle and from the brake system of the latter, so that the tendency to pitching movements which occurs during the braking or acceleration of the vehicle can be "noticed" or "predicted" even before a movement of this kind. Thus, an expected pitching movement can be counteracted with a preventive effect by an appropriate activation of the valves 1a to 4e via schematically depicted control lines 1ac to 4ec.

Furthermore, the computer control unit can be connected to a steering-angle transmitter and to a speedometer of the vehicle, so that as early as at the start of driving on a bend or at the start of a steering movement the particular expected transverse acceleration of the vehicle and therefore the tendency of the vehicle to assume a position inclined towards the outside of the bend can be detected. The computer control unit can thus activate the valves 1a to 4e with a preventive effect so that the vehicle does not incline or inclines only slightly towards the outside of the bend. It is also possible, in principle, to bring about an inclination of the vehicle towards the inside of the bend by discharging an appropriate amount of hydraulic medium from the supporting units A on the inside of the bend and feeding it to the supporting units A on the outside of the bend.

A particular benefit of the bypass and feed system is that, during the cancellation of pitching and rolling movements of the vehicle, the adjustment of the suspension system remains virtually unchanged.

In the embodiment of the invention illustrated in FIG. 2, the supporting units A are connected via the lines 1' to 4' to a motor-driven piston/cylinder unit 6 and via the lines 1" to 4" to a motor-driven piston/cylinder unit 7.

Each of the piston/cylinder units 6 and 7 possesses four chambers 61 to 64 and 71 to 74 respectively, and as regards the piston/cylinder unit 6, in the middle position of the piston at least the chambers 61 and 62 on the one hand and the chambers 63 and 64 on the other hand are of the same size (as a rule, all the chambers 61 to 64 are of equal size), whilst in the piston/cylinder unit 74 all the chambers 71 to 74 are of equal size in the middle position of the piston. Moreover, the piston/cylinder units 6 and 7 are so designed that the total volume of the chambers remains constant during the displacement of the pistons.

The chambers of the piston/cylinder units 6 and 7 are each connected to one of the supporting units A, specifically in such a way that, during the displacement of the piston of the piston/cylinder unit 6, hydraulic medium is displaced between the supporting units on the right vehicle side and the supporting units on the left vehicle side. For example, on the one hand, during the displacement of the piston on the piston/cylinder unit 6 to the left hydraulic medium is discharged from the front right supporting unit via the line 1' and at the same time hydraulic medium is introduced into the left front supporting unit via the line 2". On the other hand, there is simultaneously a corresponding displacement of the hydraulic medium via the lines 4' and 3' in the supporting units of the rear wheels.

The lateral inclination of the vehicle can be varied or a rolling movement counteracted in this way.

The chambers 71 to 74 of the piston/cylinder unit 7 are connected to the lines 1" to 4", specifically in such a way that a displacement of the hydraulic medium between the supporting units of the front wheels and those of the rear wheels becomes possible. For example, during a displacement of the piston of the piston/cylinder unit 7 upwards in FIG. 2, hydraulic medium is discharged from the rear supporting units via the lines 3" and 4" and at the same time hydraulic medium is fed to the front supporting units via the lines 1" and 2". A pitching movement of the vehicle can thereby be counteracted.

In contrast to the embodiment illustrated in FIG. 2, in which the piston/cylinder units 6 and 7 each have four chambers, piston/cylinder units with two chambers can also be arranged in pairs and be actuated in parallel. This involves no change in the illustrated functioning.

Furthermore, hydrostatic pumps with a rotating positive-displacement mechanism in the manner of gear or vane-cell pumps could also be used instead of the piston/cylinder units illustrated in FIG. 2. So that, in this case too, there is a plurality of hydraulic circuits in order proportionally to support rolling moments occurring on the two vehicle axles by the circulation of hydraulic medium, it is possible to couple mechanically two hydrostatic pumps which have the sam delivery capacity, if the rolling moments are to be absorbed approximately half by the front axle and half by the rear axle.

In the embodiment of the invention illustrated in FIG. 3, three piston/cylinder units 8 to 10, each with two chambers 81, 82 and 91, 92 and 101, 102, are provided. At the same time, the chambers 81 and 91 of the piston/cylinder units 8 and 9 ar connected to the front supporting units A are connected on the one hand to the chambers 82 and 92 of the piston/cylinder units 8 and 9 via the lines 3' and 4' and on the other hand to the chambers 101 and 102 of the piston/cylinder unit 10 via the lines 3" and 4". In the middle position of the pistons, the chambers 81, 82, 91 and 92 are of the same size. In the middle position of the piston of the piston/cylinder unit 10, the chambers 101 and 102 are of equal size and approximately twice as large as the chambers of the other two piston/cylinder units 8 and 9 in the middle position of the respective pistons.

When the piston of the piston/cylinder unit 10 is stopped and the pistons of the piston/cylinder units 8 and 9 are simultaneously displaced upwards or downwards in FIG. 3, hydraulic medium is displaced between the front and rear supporting units. During an upward displacement of the pistons of the piston/cylinder units and 9, for example hydraulic medium is discharged from the rear supporting units via the lines 3' and 4' and at the same time hydraulic medium is fed to the front supporting units via the lines 1 and 2. Pitching movements of the vehicle can be counteracted in this way.

In order to vary the lateral inclination of the vehicle or counteract rolling movements of the vehicle, hydraulic medium can be displaced between the supporting units of different sides of the vehicle, for example by displacing the piston of the piston/cylinder unit 8 downwards, the piston of the piston/cylinder unit 10 to the right and the piston of the piston/cylinder unit 9 upwards (or in the respective opposite direction). Since the capacity of the piston/cylinder unit 10 is approximately twice as large as that of the piston/cylinder unit 8 or 9, in the direction of displacement indicated the chamber 101 of the piston/cylinder unit 10 can receive not only the hydraulic medium positively displaced from the chamber 82 of the piston/cylinder unit 8, but also a corresponding quantity of approximately half of the hydraulic medium form the supporting unit of the left rear wheel (at bottom left in FIG. 3). Correspondingly, approximately half of the hydraulic medium positively displaced from the chamber 102 of the piston/cylinder unit 10 can be introduced into the supporting unit of the right rear wheel (at bottom right in FIG. 3) and approximately half be received by the chamber 92 of the piston/cylinder unit 9. At the same time, hydraulic medium is positively displaced out of the chamber 91 of the piston/cylinder unit and fed via the line 1 to the supporting unit of the right front wheel.

Even when it is usually not necessary, the system illustrated in FIG. 3 affords the possibility of displacing hydraulic medium solely between the supporting units of the front wheels or the supporting units of the rear wheels.

For the displacement of hydraulic medium between the supporting units of the rear wheels, it is sufficient to stop the piston of the piston/cylinder units 8 and 9 and to displace the piston of the piston/cylinder unit 10. During the displacement of the piston of the piston/cylinder unit 10 to the right, hydraulic medium is discharged form the supporting unit of the left rear wheel via the line 3" and at the same time hydraulic medium is introduced into the supporting unit of the right rear wheel via the line 4".

Now if, for example, hydraulic medium is to be discharged from the supporting unit of the right front wheel via the line 1 and at the same time hydraulic medium is to be introduced into the supporting unit of the left front wheel, the piston of the piston/cylinder unit 9 is displaced downwards in FIG. 3, the piston of the piston/cylinder unit 10 to the left and the piston of the piston/cylinder unit 8 upwards, specifically in such a way that the reduction in volume of the chamber 92 of the piston/cylinder unit 9 corresponds to the increase in volume of the chamber 102 of the piston/cylinder unit 10 and the reduction in volume of the chamber 101 of this piston/cylinder unit 10 corresponds to the increase in volume of the chamber 82 of the piston/cylinder unit 8.

In the event of a malfunction in the bypass and feed system, especially during malfunctions of the computer controlling this system, the bypass and feed system is preferably shut down by blocking its lines. Driving can then continue, the vehicle behaving in the same way as one with a conventional hydropneumatic suspension system.

In the embodiment illustrated in FIG. 1, in the event of such a malfunction the pump 5 is stopped and all the valves 1a to 4e are closed. For this, it is advantageous if the valves 1a to 4e are brought into the closing position automatically, for example by means of restoring springs, as soon as the electromagnets serving for controlling the valves 1a to 4e are made currentless.

In order, in the embodiments shown in FIG. 2 and 3, to allow appropriate emergency running of the vehicle, it is sufficient to equip the piston/cylinder units 6 to with self-locking drives, for example spindle units, so that the pistons of these units are kept stationary when the drives are cut off.

Insofar as rotary pumps are used instead of the piston/cylinder units 6 to 10 in FIGS. 2 and 3, it is preferable to use pumps, for example gear pumps, which can block the connection between the inlet and outlet of the pump without additional shut-off valves, when the feed member of the pump is stopped. If pumps of this type are equipped with self-locking drives, it is sufficient to stop or cut off the drives in order to block the lines of the bypass and feed system in the event of a malfunction.

However, if appropriate, separate shut-off valves can also be provided for this purpose.

A particular benefit of the invention is that the control tendency of the vehicle, namely understeering, oversteering or neutral behavior, can also be influenced or determined by means of the bypass and feed system. For example, rolling movements of the vehicle can be countered in that differing torques counteracting the rolling movement are generated relative to the longitudinal axis of the vehicle on the front axle and rear axle by calculating accordingly, if appropriate also with a sharp difference, the quantities of the hydraulic medium displaced between the supporting units of the front axle on the one hand and between the supporting units of the rear axle on the other hand.

So that, for example in the embodiment according to FIG. 2, markedly different countermoments can be generated on the front and rear axles to compensate rolling moments of the vehicle, the hydraulically effective cross-sections of the pistons in the chambers 61 and 62 on the one hand and 63 and 64 on the other hand can be calculated with a clear difference. It is desirable, as a rule, to counteract rolling moments to a greater extent via the front axle; accordingly, as a rule, the effective piston cross-section in the chambers 61 and 62 will be larger than in the chambers 63 and 64.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. Hydropneumatic suspension system for motor vehicles of the type having a plurality of vehicle wheels, comprising:
   a primary hydraulic medium reservoir,
   a primary hydraulic pressure source,
   hydropneumatic support units assigned to each of a plurality of vehicle wheels,
   a vehicle levelling control system including level-control valves for selectively connecting the support units with said primary pressure source and said primary reservoir as a function of the lifting position of a vehicle wheel associated with the respective support unit,
   and an active bypass and feed system for displacing hydraulic medium between respective supporting units in bypassing relationship to the primary pressure source and primary reservoir, to thereby control at least one of vehicle pitch and roll, wherein the active bypass and feed system is faster acting than the vehicle levelling control system.

2. Hydropneumatic suspension system according to claim 1, wherein the bypass and feed system includes:
   a line network arranged between the supporting units,
   a motor-driving pump, and
   shut-off valves which are arranged on the line network and which make it possible to connect a particular supporting unit or a group of supporting units to the inlet side of the pump and another supporting unit or another group of supporting units to the outlet side of the pump or to isolate the supporting units or groups of supporting units from one another.

3. Hydropneumatic suspension system according to claim 1, wherein the bypass and feed system includes one of positive-displacement and piston/cylinder units, each with at least two chamber, arranged between the supporting units located opposite one another in relation to one of the transverse axis of the vehicle and the longitudinal axis of the vehicle, the total volume of which units remains constant irrespective of a respective one of positive-displacement and piston stroke, and respectively one of the chambers of the units is connected to a supporting unit on one side and the other chamber to a supporting unit on the other side of said one of the longitudinal axis of the vehicle and the transverse axis of the vehicle.

4. Hydropneumatic suspension system according to claim 1, comprising computer control means for controlling the bypass and feed system as a function of respective lifting positions of the wheels.

5. Hydropneumatic suspension system according to claim 1, comprising computer control means for controlling the bypass and feed system as a function of respective lifting positions of the wheels and/or as a function of the longitudinal or transverse acceleration of the vehicle.

6. Hydropneumatic suspension system according to claim 1, comprising computer control means for controlling the bypass and feed system as a function of respective lifting positions of the wheels and/or as a function of the steering angle or steering-angle changes and the driving speed of the vehicle.

7. Hydropneumatic suspension system according to claim 4, comprising computer control means for controlling the bypass and feed system as a function of respective lifting positions of the wheels and/or as a function of the longitudinal or transverse acceleration of the vehicle.

8. Hydropneumatic suspension system according to claim 4, comprising computer control means for controlling the bypass and feed system as a function of respective lifting positions of the wheels and/or as a function of the steering angle or steering-angle changes and the driving speed of the vehicle.

9. Hydropneumatic suspension system according to claim 7, comprising computer control means for controlling the bypass and feed system as a function of respective lifting positions of the wheels and/or as a function of the steering angle or steering-angle changes and the driving speed of the vehicle.

10. Hydropneumatic suspension system according to claim 1, wherein mechanical spring units are arranged in parallel with the hydropneumatic supporting units.

11. Hydropneumatic suspension system according to claim 1, wherein hydraulic medium feed units of the bypass and feed system have self-locking drives and, when shut down, keep the lines connected thereto isolated from one another.

12. Hydropneumatic suspension system according to claim 1, wherein, to prevent rolling movements of the vehicle, the bypass and feed system includes means for displacing calculated quantities of hydraulic medium between the supporting units of the rear axle such that different moments counteracting the rolling moment of the vehicle are generated on the front and rear axles and a desired control tendency of the vehicle is obtained.

13. Hydropneumatic suspension system according to claim 1, wherein the bypass and feed system includes an active hydraulic medium feed unit means which is supplied by actuating energy means, and wherein means are provided for preventing displacement of hydraulic medium in the bypass and feed system even with larger pressure differences between support units when said actuating energy means is cut-off, thereby facilitating normal driving operation of the levelling control system with a malfunctioning feed unit means and bypass and feed system.

* * * * *